(12) United States Patent
Snyder et al.

(10) Patent No.: US 7,333,210 B2
(45) Date of Patent: Feb. 19, 2008

(54) METHOD AND APPARATUS FOR FEEDBACK CONTROL OF TUNABLE LASER WAVELENGTH

(75) Inventors: James J. Snyder, Matthews, NC (US); Stephen L. Kwiatowski, Sunnyvale, CA (US)

(73) Assignee: Fizeau Electro-Optic Systems, LLC, Matthews, NC (US)

( * ) Notice: Subject to any disclaimer, the term of this patent is extended or adjusted under 35 U.S.C. 154(b) by 338 days.

(21) Appl. No.: 11/216,548

(22) Filed: Aug. 30, 2005

(65) Prior Publication Data

US 2006/0007447 A1    Jan. 12, 2006

Related U.S. Application Data

(63) Continuation-in-part of application No. 10/672,889, filed on Sep. 26, 2003.

(51) Int. Cl.
    *G01B 9/02* (2006.01)
(52) U.S. Cl. .................. 356/477; 356/450; 356/28.5
(58) Field of Classification Search ............ 356/450, 356/460, 464, 466, 477–479, 28.5; 372/32, 372/29.021
    See application file for complete search history.

(56) References Cited

U.S. PATENT DOCUMENTS

| | | | |
|---|---|---|---|
| 4,173,442 A | 11/1979 | Snyder | |
| 4,319,843 A | 3/1982 | Gornall | |
| 4,426,155 A * | 1/1984 | Monchalin | 356/452 |
| 5,420,687 A | 5/1995 | Kachanov | |
| 5,543,916 A | 8/1996 | Kachanov | |
| 6,331,892 B1 * | 12/2001 | Green | 356/451 |
| 6,496,265 B1 * | 12/2002 | Duncan et al. | 356/479 |
| 6,597,462 B2 * | 7/2003 | Kramer et al. | 356/519 |
| 6,665,076 B1 * | 12/2003 | Watterson et al. | 356/454 |
| 7,038,782 B2 * | 5/2006 | Hedin et al. | 356/454 |
| 7,259,860 B2 * | 8/2007 | Marron et al. | 356/451 |

OTHER PUBLICATIONS

Snyder, J.J., "Algorithm for fast digital analysis of interference fringes", *Applied Optics 19*, 1223 (1980).

J.H. Bruing, "Fringe Scanning Interferometers", in *Optical Shop Testing*, Daniel Malacara, ed. (John Wiley and Sons, New York, 1978) 409-437.

Katherine Creath, "Phase-Measurement Interferometry Techniques," in *Progress in Optics XXXVI*, E. Wolf, ed. (North-Holland, Amsterdam, 1988, 349-393).

* cited by examiner

*Primary Examiner*—Sang H. Nguyen
(74) *Attorney, Agent, or Firm*—Buchanan, Ingersoll & Rooney LLP

(57) ABSTRACT

A method and system for controlling the wavelength of light emitted by a tunable laser. The system includes a wavelength tuner that provides information of a desired wavelength; a coupler for tapping a portion of the light from the tunable laser; and an apparatus for measuring the actual wavelength of the light. The apparatus takes the portion of the light as an input signal and splits the input signal into two beams that are directed through two paths of different optical lengths. Then, the two beams are interfered with each other in order to form a fringe pattern at an observation plane, where the fringe pattern is detected and analyzed to determine the wavelength of the light. A processor compares the difference between the desired and determined wavelengths, and sends a tuning signal to the tunable laser forming a feedback control of the tunable laser.

21 Claims, 8 Drawing Sheets

METHOD AND APPARATUS FOR FEEDBACK CONTROL OF TUNABLE LASER WAVELENGTH

CROSS-REFERENCE TO RELATE APPLICATIONS

This application is a continuation-in-part of U.S. application Ser. No. 10/672,889, filed on Sep. 26, 2003, which is incorporated herein in its entirety.

BACKGROUND OF THE INVENTION

1. Field of the Invention

The invention relates to laser wavelength control, and more particularly, wavelength feedback control of a tunable laser based on the Young's interferometer configuration.

2. Description of the Related Art

A laser wavelength meter, or wavemeter, is an instrument that directly measures the wavelength of light emitted by a laser. In the past, wavemeters have been commonly used in spectroscopic studies to monitor the wavelength of a tunable laser that excites some atomic or molecular transition. More recently, wavemeters are used to measure the wavelength of telecom laser sources in Wavelength Division Multiplexing (WDM) networks in order to ensure that the source is properly tuned to its channel in the ITU grid.

The accuracy required of a wavemeter depends on the application: Linear spectroscopy and telecom applications typically require accuracy of about $10^{-6}$ while non-linear spectroscopy may require a more demanding $10^{-7}$ to $10^{-8}$. Commercially available wavemeters offer accuracy ranging from a few parts in $10^{-5}$ to a few parts in $10^{-7}$.

With few exceptions, wavemeters are based on some type of interferometer. The most common class of wavemeter is a form of Michelson interferometer in which the incident laser beam under test is divided by a beam splitter, sent down two different paths to moving retroreflectors that return the beams with smoothly varying optical path difference, and then recombined by the beam splitter to form fringes. See for example U.S. Pat. No. 4,319,843 (Gornall). The fringe intensity, which oscillates as the optical path difference changes, is detected, and the oscillations counted over some time interval. A reference laser beam, of precisely known wavelength, is injected into the same interferometer in parallel with the laser beam under test, and the oscillations of the reference laser's fringes are counted over the same interval. The ratio of the two fringe counts is equal to the inverse ratio of the wavelengths, and since one wavelength is known, the unknown wavelength is easily calculated.

Michelson wavemeters are conceptually simple, straightforward to construct, and capable of high accuracy. However, they require a reference laser as well as a translation stage to move the retroreflectors over relatively long distances at constant velocity, and are therefore not very compact or robust, and do not provide very rapid updates. In addition, since they must count every fringe during a scan distance of the order of a centimeter, they are only applicable to relatively narrow bandwidth cw lasers.

U.S. Pat. No. 4,173,442 (Snyder) discloses a wavemeter based on the Fizeau interferometer. This interferometer consists of a glass plate with a slight wedge that is illuminated by a collimated laser beam. The reflections from the first and second surfaces of the glass plate generate collimated beams that propagate in slightly different directions. Therefore, the two beams produce a pattern of straight, uniformly spaced, sinusoidal fringes over their overlap region. Snyder teaches that this fringe pattern, if recorded by a linear photodiode array and digitized, could be analyzed to determine the wavelength of the laser beam. Unlike the Michelson wavemeters, the Fizeau wavemeter is calibrated during manufacture, and does not require a reference laser. Because the photodiode array records the instantaneous fringe pattern, both cw and pulsed lasers can be measured. Moreover, since it has no moving parts, the Fizeau wavemeter is inherently more robust and can provide a higher measurement update rate than the Michelson wavemeter.

Although the Fizeau wavemeter offers advantages over the Michelson wavemeter, it requires precise opto-mechanical alignment, and it was found to suffer from systematic errors related to chromatic and other aberrations, and from thermo-mechanical instability. Some of these problems are addressed by U.S. Pat. No. 5,420,687 (Kachanov) and U.S. Pat. No. 5,543,916 (Kachanov), who simplified the optical system by eliminating the collimating mirror, and replacing the wedge with a glass plate with parallel surfaces. The Kachanov design produces a fringe pattern similar to the Fizeau, that can be analyzed in the same way. Although the Kachanov design is simpler than the Snyder design, the alignment requirements are similar and in practice the performance is not improved. In addition, it proved technically difficult to reduce the package size of either the Fizeau wavemeter or the Kachanov wavemeter much below the size of other wavemeters of comparable accuracy.

As a conventional tunable laser may require a high quality wavelength control system to meet required standards of various laser applications, the inaccuracy and complexity of an existing wavemeter may translate into the inaccuracy in the laser output and/or complexity of the wavelength control system. Thus, there is a strong need for a control system to monitor and control the wavelength of tunable laser light based on a wavemeter that is simple, yet can provide enhanced accuracy in wavelength measurements.

BRIEF SUMMARY OF THE INVENTION

In accordance with the invention, there is provided a control unit for controlling the wavelength of light from a tunable laser. The control unit includes: a wavelength tuner for providing information of a desired wavelength; a coupler for tapping a portion of light from the tunable laser; and an apparatus for measuring the actual wavelength of the light. The apparatus includes an optical device having an input port and two output ports, the optical device defining first and second optical paths which operate to direct light from the input port to the first and second output ports, respectively, and which have optical lengths which differ by a first optical length difference. The two output ports are separated by a separation distance such that light exiting the optical device through the two output ports forms, at an observation plane disposed at a second distance from the two output ports, a fringe pattern whose configuration at the observation plane is a function of the wavelength of the input light beam. The apparatus further includes: a photo detector for receiving an image of the fringe pattern at the observation plane and generating one or more detection signals responsive thereto; and a processor for receiving the detection signals from the photo detector, for analyzing the detection signals to determine the actual wavelength of the light, for receiving the information of a desired wavelength from the wavelength tuner, for calculating an error value representing a difference between the desired wavelength and the actual wavelength and for sending a control signal commensurate with the error value to the tunable laser to tune the tunable laser.

Further in accordance with the invention, there is provided a method for feedback controlling a tunable laser to generate light having a desired wavelength. The method includes steps of: tapping a portion of light emitted by the tunable laser; splitting the tapped portion of light into two light beams; directing the two light beams through two paths of different optical length to thereby cause the two light beams have two optical delays, respectively; causing the directed two light beams to interfere with each other to form a fringe pattern at an observation plane; detecting an image of the fringe pattern at the observation plane; analyzing the detected image to determine the actual wavelength of the light; calculating a difference between the actual wavelength and the desired wavelength; and sending to the tunable laser a wavelength tuning signal commensurate with the calculated difference to tune the tunable laser.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
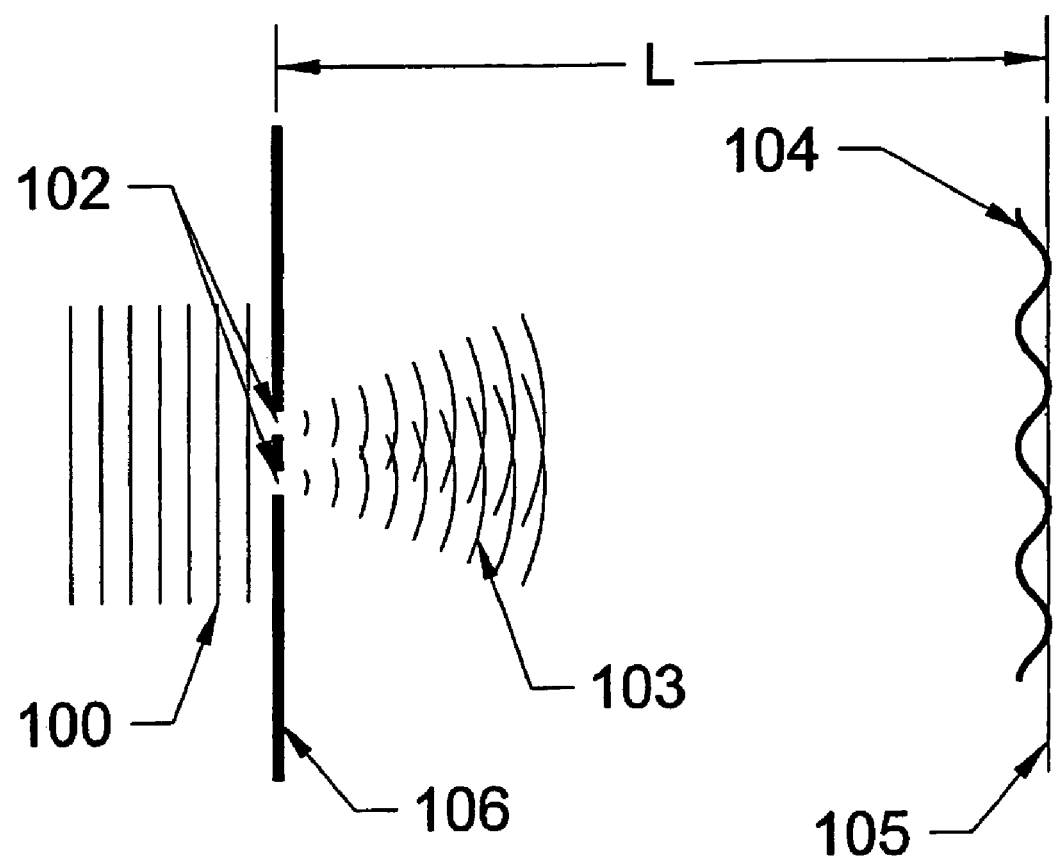
FIG. 1 is a schematic diagram illustrating the principle of a Young's interferometer

FIG. 1 shows a schematic view of prior art known as Young's interferometer. The basic instrument consists of a pair of apertures 102 located in an opaque surface 106 that is illuminated by a normal-incidence collimated beam of light 100. The two apertures 102 transmit light that diffracts in spherical waves 103. At some point a distance L beyond the opaque surface 106 is an observation plane 105. The spherical waves 103 from the apertures 102 form straight, uniformly spaced fringes 104 at the observation plane 105.

The half-angle divergence of the light from each of the apertures 102 is approximately given by $$\theta = \frac{\lambda}{\pi w_0}, \quad (1)$$

where $w_0$ is the radius of the aperture and $\lambda$ is the wavelength of the light. If the separation of the opaque surface 106 and the observation plane 105 is L, then the distance over which the fringes are visible is approximately $$W = 2\theta L. \quad (2)$$

The path difference between the two diffracted waves 103 at the observation plane 105 is given by $$\delta = \frac{xs}{2L}, \quad (3)$$

where x is the distance along the observation plane 105 and parallel to a line between the two apertures 102, and s is the separation of said apertures. The peaks of the fringe pattern 4 occur at positions for which $$\frac{\delta}{\lambda} = \frac{xs}{2L\lambda} = n, \quad (4)$$

where $$n = 0, \pm 1, \pm 2, \ldots \quad (5)$$

is the order number of interference. The distance x is measured from the point directly opposite the midpoint between the two apertures 102. The fringe maximum at x=0 has the order number of 0.

The spatial period of the fringe pattern at the observation plane is the distance between maxima, $$\Lambda = \frac{2\lambda L}{s}. \quad (6)$$

The number of fringes visible over the width W is $$M = \frac{s\theta}{\lambda}. \quad (7)$$

Figure 2:
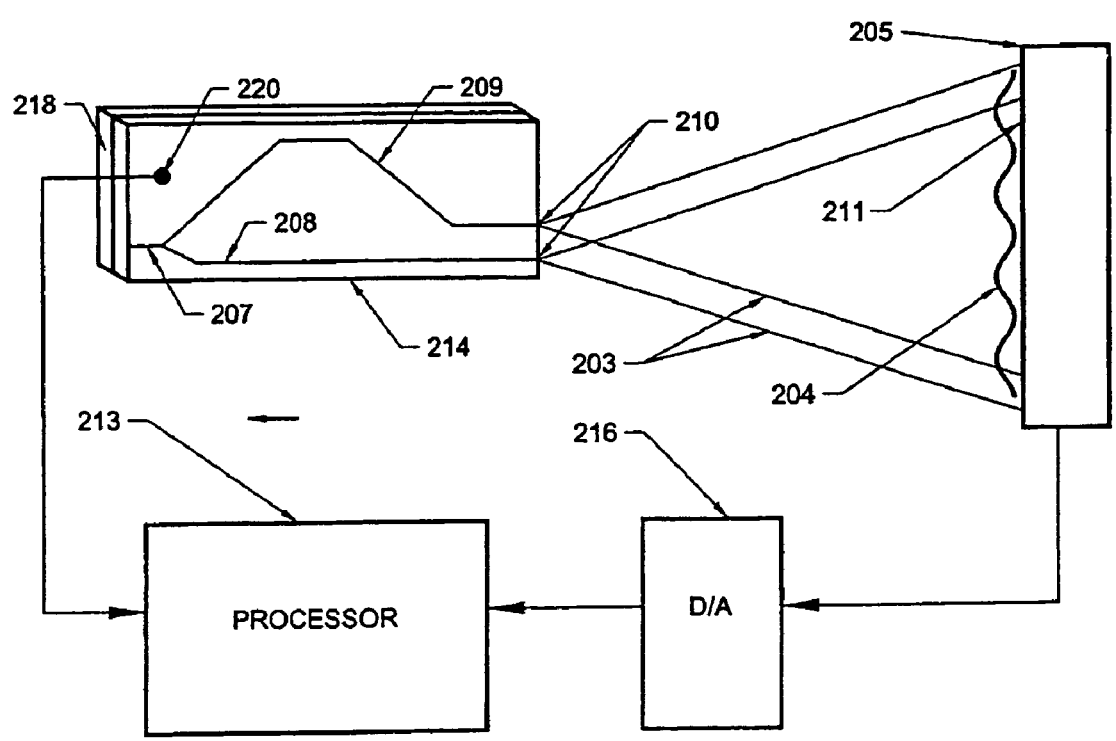
FIG. 2 is block diagram of a wavemeter in accordance with a previous embodiment of the invention.

FIG. 2 is block diagram of a wavemeter in accordance with a previous embodiment of the invention. Light with wavelength in the region of 1.2 to 1.7 µm (to include the telecom regions at 1.3 and 1.5 µm) is coupled into the input port 207 of a planar waveguide beam splitter 214. The waveguide is fabricated from $SiO_2$ on a silicon substrate, using techniques well known to those familiar with the art, and has a mode diameter of about 9.8 µm in the plane of the substrate. At a wavelength of 1.55 µm, the divergence half-angle of a 9.8 µm diameter mode is 0.1 radians.

The input light is split by the beam splitter into substantially equal amounts of power traveling in a first branch 208 and a second branch 209 of the waveguide. The two branches 208 and 209 of the waveguide have different optical and/or physical lengths, as shown schematically in FIG. 2. The difference is a physical length difference of about 2.33 mm. The index of refraction of $SiO_2$ at 1.55 μm is 1.444, so the light in the longer path is delayed by 2,500 wavelengths. For other wavelengths, the delay will be more or less. This delay offsets the order number of the fringes so that at the center of the fringe pattern produced by 1.55 μm light, the order number is approximately 2,500. The exact value of the optical delay is found by calibrating the instrument using a laser with a known wavelength.

With reference again to FIG. 2, output ports 210 of the waveguide 214 are positioned facing a photodiode array sensor 211 located at the observation plane 205 disposed about 63.5 mm from the waveguide. At this distance, and with a divergence half-angle of 0.1 radians, the beams 3 from the two output ports 210 illuminate a spot 12.7 mm in diameter. The photodiode array sensor 211 preferably comprises 512 pixels with about 25 μm center-to-center separation, for a total length of about 12.8 mm, and responds to radiation wavelengths of from about 0.9 to about 1.7 μm. The photodiode array sensor 211 can be for example an InGaAs linear image sensor type G8051-512R available from Hamamatsu, or other photo detector having discrete light sensing elements of suitable sensitivity and sufficient resolution to differentiate fringe maxima and minima of the fringe pattern. It will be appreciated that the physical location of the photodiode array 211 is not limited to the observation plane position. The observation plane in this sense is intended to be a reference position at which the configuration of the fringe pattern is analyzed to obtain information about the wavelength of the light. Means, such as waveguides and optical fibers, can be used to transmit this information to locations at which the photodiode array 211 can be more conveniently disposed and which are in fact remote from the observation plane.

Figure 3:
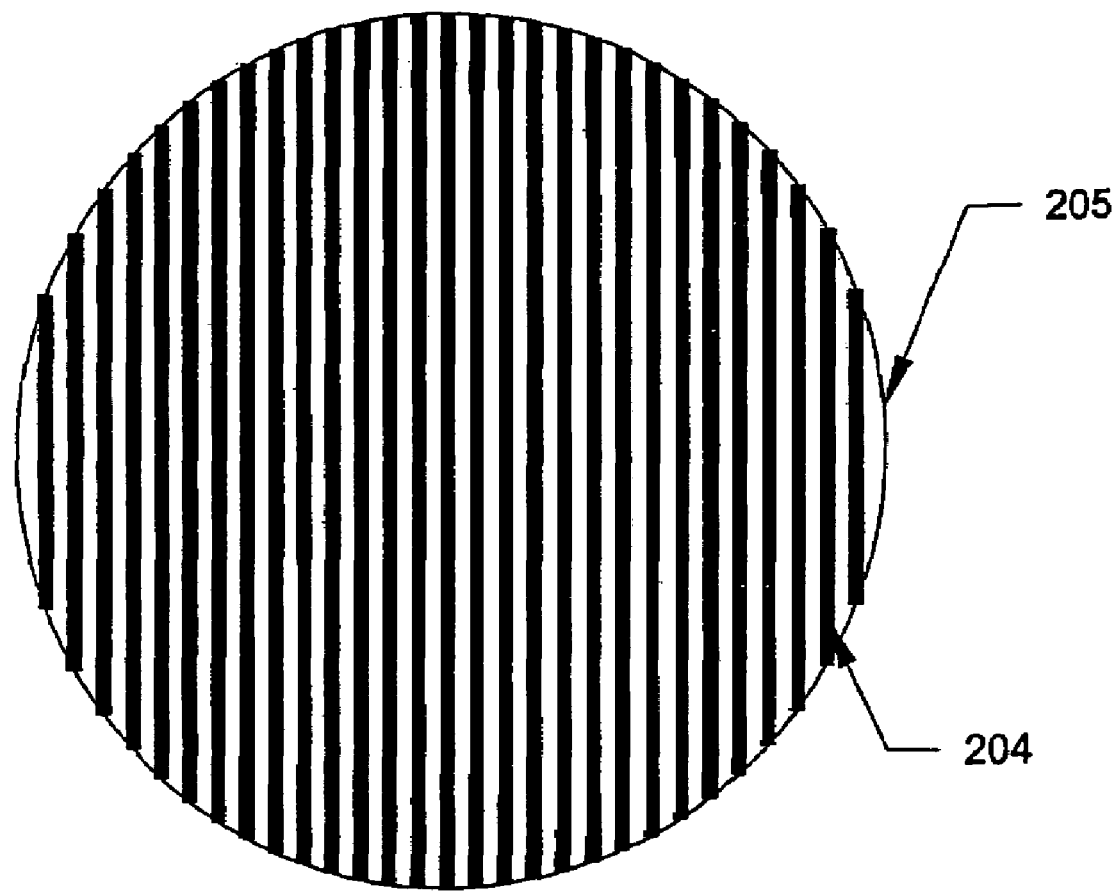
FIG. 3 is a schematic diagram of a fringe pattern generated by the wavemeter depicted in FIG. 2.

The separation between output ports 210 is about 465 μm, which provides approximately 30 fringes 4 across the photodiode array 211. The diffracted light beams 203 from output ports 210 illuminate the photodiode array 211 and produce a fringe pattern 204 that is detected by photodiode array 211. A typical fringe pattern 204 is shown in FIG. 3 as it might appear at the observation plane 205. The linear photodiode array 211 detects the intensity along the horizontal diameter of the pattern 204.

Signals from photodiode array 211 indicative of the configuration of the fringe pattern 204 are transmitted to an analog-to-digital converter 216 and converted thereby to a sequence of digital values. The digital values are further transmitted to a computer or other processor 213 wherein they are processed and analyzed to determine the wavelength of the light as described herein.

The accuracy of the wavelength measurement depends in large part on the stability of the optical delay of the waveguide beam splitter. Both the physical length and the index of refraction of the silica waveguide are functions of temperature, so the optical delay is also a function of temperature. The planar waveguide 214 is mounted on a heat sink plate 218 of a material with high thermal conductivity, such as copper. The heat sink minimizes temperature gradients along the waveguide. The temperature of the heat sink 218 and/or waveguide 214 can be monitored by one or more temperature sensors 220, which generate temperature signals that are input to processor 213. The monitored temperature is digitized and recorded by the processor 213, which uses the information to calculate the value of the optical delay of the two branches 208 and 209. Alternatively or in addition, the temperature of the heat sink plate 218 can be actively or passively regulated. Active regulation can include for example passing a cooling fluid through the heat sink, and controlling the temperature of the cooling fluid through a feedback loop in connection with a cooling module (not shown).

Figure 5:
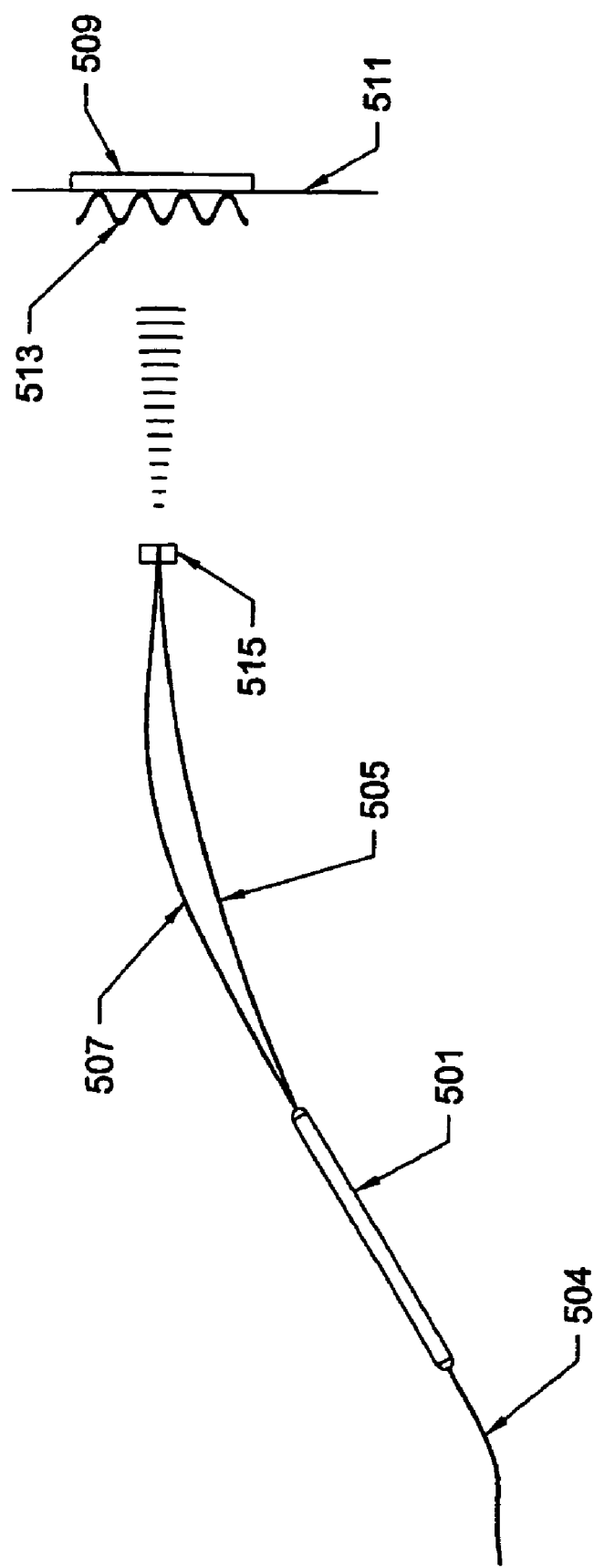
FIG. 5 is a diagram of a wavemeter in accordance with another previous embodiment of the present invention.

Those familiar with the art will appreciate that the beam splitter with optical delay could be realized by means other than a planar waveguide, including fiber optics and bulk optics. For example, an alternate embodiment, shown in FIG. 5, uses a fiber optic splitter 501, wherein incoming light 503 is directed through an input fiber 504 into two output fibers 505, 507 of lengths differing by 2.33 mm to provide essentially the same splitting of power and introduction of delay as the above arrangement. A photodiode array 509 is disposed at observation plane 511 and generates signals responsive to the fringe 513 formed on the observation plane. The two output fibers 505 and 507 are securely mounted in a silicon V-groove 515, for example one commercially available from Oz Optics in Ontario, Canada, with a separation of 500 μm between the fibers. This spacing provides 32 fringes across the photodiode array 509. Temperature monitoring and/or control can be effected in a similar manner to that described above with respect to the FIG. 2 arrangement.

In the arrangement of FIG. 2, the fringe pattern is detected and digitized using a 512-pixel linear detector array. The digitized image is analyzed statistically to determine the average period of approximately 30 fringes, and the position (phase) of the center fringe of the pattern. The wavelength is determined by a "bootstrap" process in which the fringe period is converted to an unambiguous, low resolution wavelength value, accurate to within the free spectral range of the interferometer (about 0.620 nm), whereas the position (phase) of the center fringe provides a high-resolution correction within the free spectral range. Although the signal-to-background ratio of individual detector pixels is limited, the statistical analysis improves the measurement resolution to better than $10^{-3}$ for both the period and the phase. Since the phase is the fractional part of an order number of about 2500, the uncertainty in the high resolution correction is better than $10^{-6}$. In effect, limitations in the signal-to-background ratio of the detector array are compensated by averaging over the 512 pixels, providing an ultimate measurement accuracy of about $10^{-6}$. It should be noted that that the low resolution, period determination may not be necessary in some applications, where for example, because of the type of laser, the wavelength range in such an instance is limited to something less than the free spectral range, and only the high resolution phase determination will be required to uniquely define the wavelength.

Figure 4:
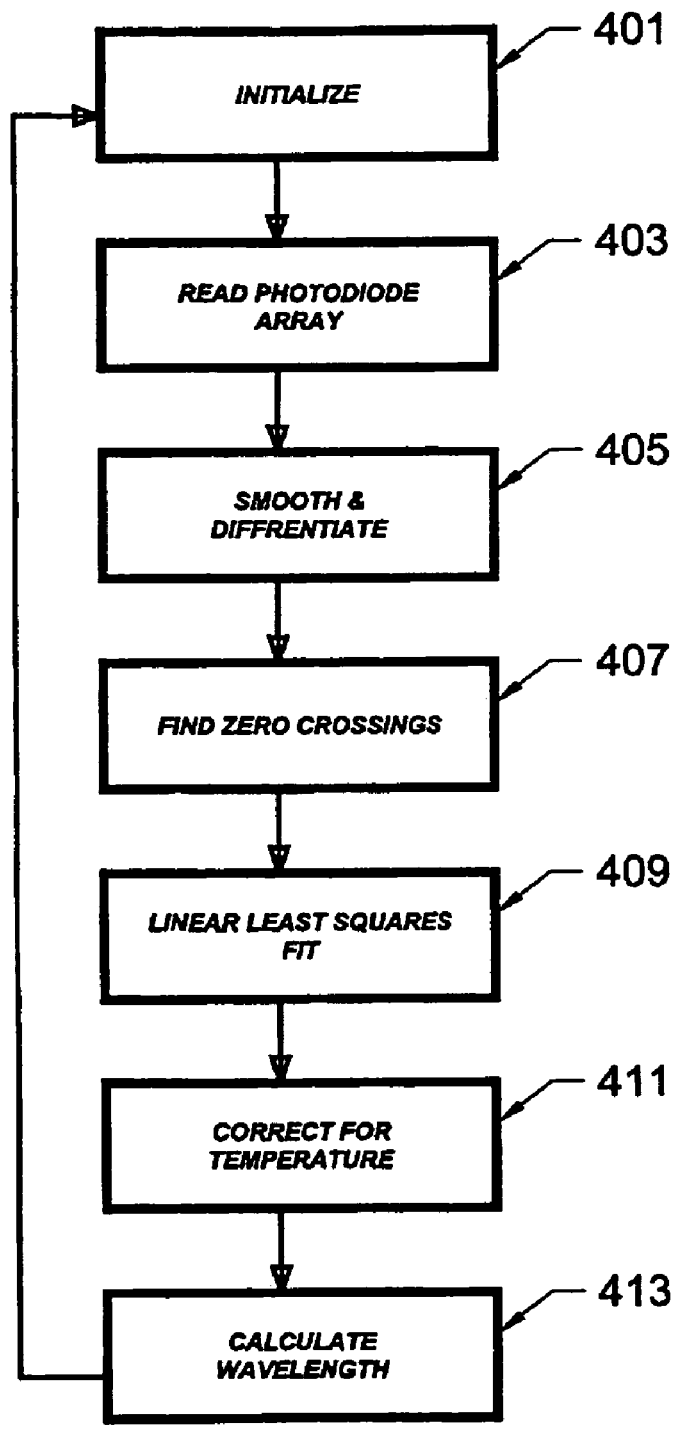
FIG. 4 is a flow chart of an analysis process illustrating steps that may be carried out to determine a wavelength using the wavemeter depicted in FIG. 2.

The bootstrap analysis method is akin to that taught by U.S. Pat. No. 4,173,442 (Snyder), and is explained technically and in greater detail with reference to FIG. 4. After initialization (Step 401), the photodiode array 211 is read (Step 403) and the data is digitally filtered, for example in accordance with the techniques taught in Snyder, J. J., "Algorithm for fast digital analysis of interference fringes," Applied Optics 19, 1223 (1980), in order to smooth it and remove the dc term (Step 405), and the pixel addresses of the approximately 60 zero crossings are found (407). The sequence of the pixel addresses of the zero crossings is fit by a linear least squares routine to a straight line. (Step 409). The slope of the fitted line, which is inversely proportional to the wavelength, is used to calculate a preliminary wavelength. Because of the filtering and least squares fitting, the uncertainty in the slope of the line, and therefore in the preliminary wavelength is estimated to be about one part in $10^4$, which is sufficient to calculate unambiguously the whole number part of the order number. The fractional part of the order number is equal to the Y-intercept of the fitted line, modulo the spatial period of the fringe pattern. The two parts of the order number are combined to give an exact order number, which is divided into the known optical delay to give the exact wavelength (step 413). The uncertainty in the fractional part of the order number is similarly estimated to be about one part in 400. Since the whole part of the order number is about 2,500, the combined uncertainty in the wavelength measurement is approximately one part in $10^6$. Any temperature correction and compensation is performed in Step 411.

An alternative to digitizing and analyzing the full array of fringes is to measure the local phase at two points in the fringe pattern. For example, suppose the two points are separated by ten fringes. The difference in phase (divided by two) between the two points varies with wavelength as if the interferometer had an order number of ten, or a free spectral range of 150 nm (at 1550 nm). Therefore, if the input wavelength is restricted to the range of 1475 to 1625 nm (i.e., including the L, C, and S telecom bands), then the difference phase provides an unambiguous, low resolution measure of the wavelength.

On the other hand, the average phase at the two points varies with wavelength according to the average order number of the interferometer, 2500. Therefore, the average phase provides a high resolution correction within the free spectral range of the interferometer.

If the two phase measurements can be made with the same resolution achieved with the linear array, then the low resolution wavelength is sufficiently accurate to resolve the free spectral range of the interferometer, and the high resolution correction provides the same final measurement accuracy of about $10^{-6}$.

In time-domain interferometry, where the interferometric phase can be modulated, phase measurements utilize a procedure referred to as phase-shift interferometry. (See for example, J. H. Bruing, "Fringe Scanning Interferometers," in *Optical Shop Testing*, Daniel Malacara, ed. (John Wiley and Sons, New York, 1978), 409-437. See also Katherine Creath, "Phase-Measurement Interferometry Techniques," in *Progress in Optics* XXXVI, E. Wolf, ed. (North-Holland, Amsterdam, 1988), 349-393). In phase-shift interferometry, four measurements of the fringe intensity are made at phase values separated by p/2. If the four intensity measurements are designated $I_0$ through $I_3$, then the phase, within a fixed offset, is given by $$\phi = \tan^{-1}\left(\frac{I_1 - I_3}{I_0 - I_2}\right). \quad (8)$$

In spatial-domain interferometry, the phase cannot be modulated without introducing undesirable complexity in the interferometer. However, four detectors, spatially separated by ¼ fringe accomplishes the same function. If the outputs from the four detectors are designated $I_0$ through $I_3$, then the phase is given by Eq. (8). In fact, the four detectors could be coupled to optical fibers, and the distal ends of the fibers held in an array (such as a silicon V-groove) positioned at the desired location in the fringe pattern. Therefore, to measure the phase at two points in the fringe pattern would require two such arrays of pickup fibers, coupled to eight detectors. A measurement of the wavelength would require the digitization of the eight detectors, normalization to account for the Gaussian fringe envelope, and calculation of Eq. (8) twice.

Figure 6:
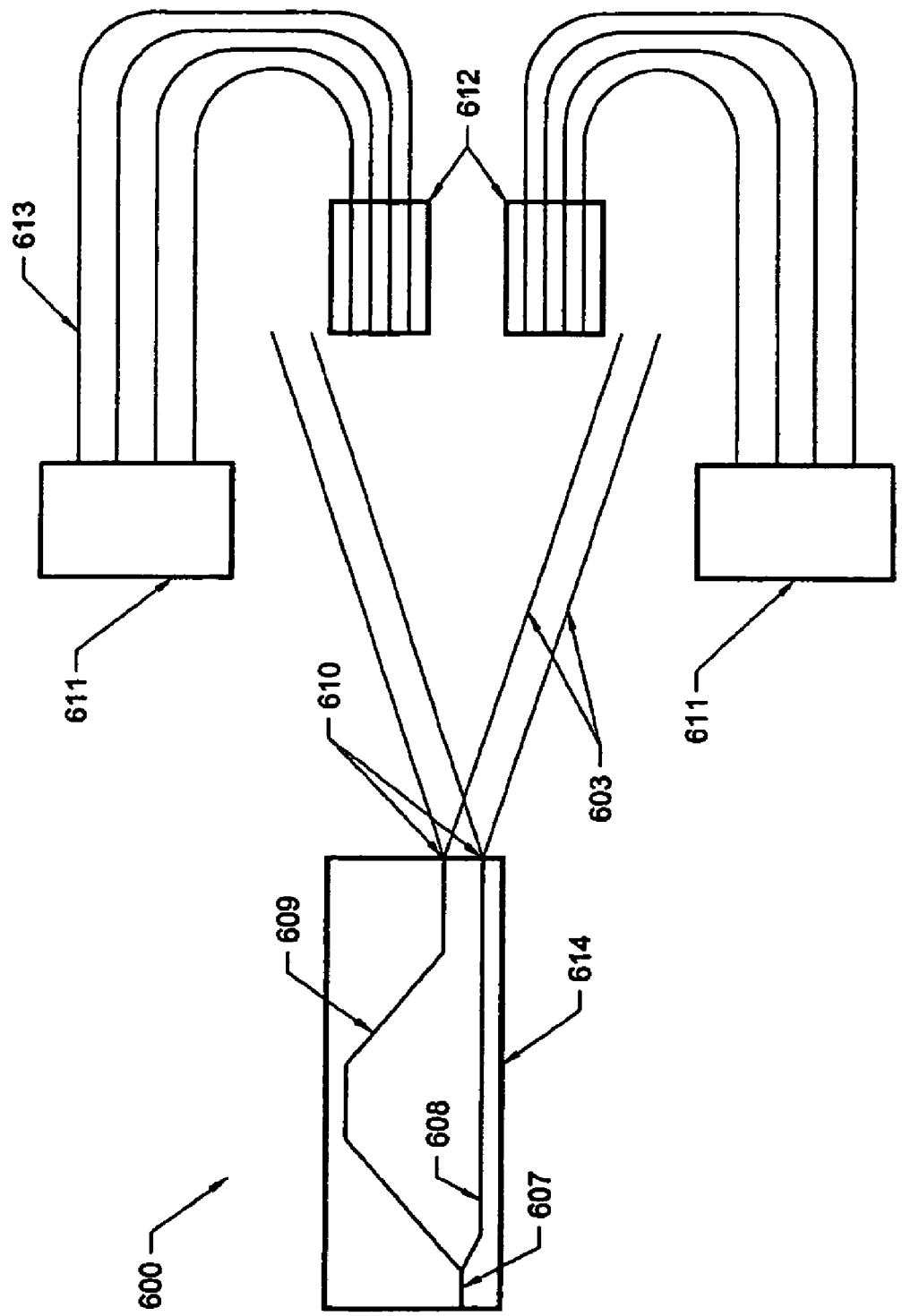
FIG. 6 is a diagram of a phase sensing wavemeter in accordance with still another previous embodiment of the invention.

FIG. 6 is a diagram of a phase sensing wavemeter shown at 600 in accordance with another previous embodiment of the invention. Input light with wavelength in the region of about 1.475 to about 1.625 µm is coupled into the input port 607 of integrated optical (circuit) beam splitter (or, equivalently planar waveguide beam splitter) 614. The integrated optical beam splitter 614 is fabricated from $SiO_2$ on a silicon substrate, and has a mode diameter of about 9.8 µm in the plane of the substrate. At a wavelength of 1.55 µm, the divergence half-angle of a 9.8 µm diameter mode is 0.1 radians.

The input light 602 is split by beam splitter 614 into substantially equal amounts of power traveling in the first branch 608 and the second branch 609 of the integrated optical beam splitter. The two branches 608 and 609 of the waveguide have different optical and/or physical lengths, as seen schematically from FIG. 6, which shows a physical length difference. The physical length difference is preferably about 2.33 mm. The index of refraction of $SiO_2$ at 1.55 µm is 1.444, so the light in the longer path is delayed by 2,500 wavelengths. For other wavelengths, the delay will be more or less. This delay offsets the order number of the fringes so that at the center of the fringe pattern produced by 1.55 µm light, the order number is approximately 2,500. The exact value of the optical delay is found by calibrating the instrument using a laser with a known wavelength.

The two output ports 610 of the waveguide 614 are separated by 150 µm, so that the fringe pattern contains about 20 fringes at 1.55 µm. The output ports 610 are positioned facing a pair of phase sensors 612 located at a distance of 48.4 mm. At this distance, the fringe spacing at 1.55 µm is 1.0 mm. The phase sensors 612 (not shown to scale) contain four optical fibers 613 held in a linear array by a silicon v-groove at a spacing of 0.250 mm (¼ fringe). The center-to-center distance between the two phase sensors is 10 mm (10 fringes).

The four fibers 613 from each phase sensor 612 terminate at four infrared detectors (not shown) in a circuit 611 that amplifies and digitizes their signals. The digitized signals from the circuits 611 are then processed in a microprocessor (not shown) according to Eq. (8) above, and combined with the calibration values to determine the wavelength.

Those familiar with the art will realize that the beam splitter with optical delay could be realized by means other than a planar waveguide, including fiber optics and bulk optics in a configuration similar to that described above with respect to FIG. 5. For example, an alternate embodiment having a fiber optic splitter with the output fibers cut to lengths differing by 2.33 mm provides essentially the same splitting of power and introduction of delay as the waveguide of FIG. 6. Moreover, the amount of optical delay is not critical, but could vary between 1 and 5 mm, or more, depending on the pixel signal-to-noise ration of the detector and on the fringe pattern stability.

It will be apparent to those familiar with the art that the separation of the two output fibers 210 and 610 in FIG. 2 and FIG. 6 can have values other than those described above. For example, the fiber separation could be as little as 0.050 mm to as much as 5 mm in alternative embodiments.

Those familiar with the art will also realize that although the previous embodiments described in FIGS. 1-6 is intended for use at telecom wavelengths (around 1.5 µm), a similar device could be built for use at other wavelengths. For the visible spectrum, for example, Si detectors for the phase sensors and a fiber or waveguide coupler that operates at visible wavelengths could be used in lieu of the infrared components of the previous embodiments.

Further, it will be appreciated that the accuracy of the wave meter might be affected by polarization mode dispersion in the output branches 208 and 209 of the interferometer. In the presence of polarization mode dispersion, the optical path difference of the interferometer will be different for different input polarizations, which may adversely affect the accuracy. For situations for which this is a problem, a polarizer (not shown) in front of the phase sensors could be used to restrict the phase measurement to a single polarization state. Alternatively, a polarization sensor (also not shown) could sense the output polarization state, so that the processor can apply a correction term.

Figure 7:
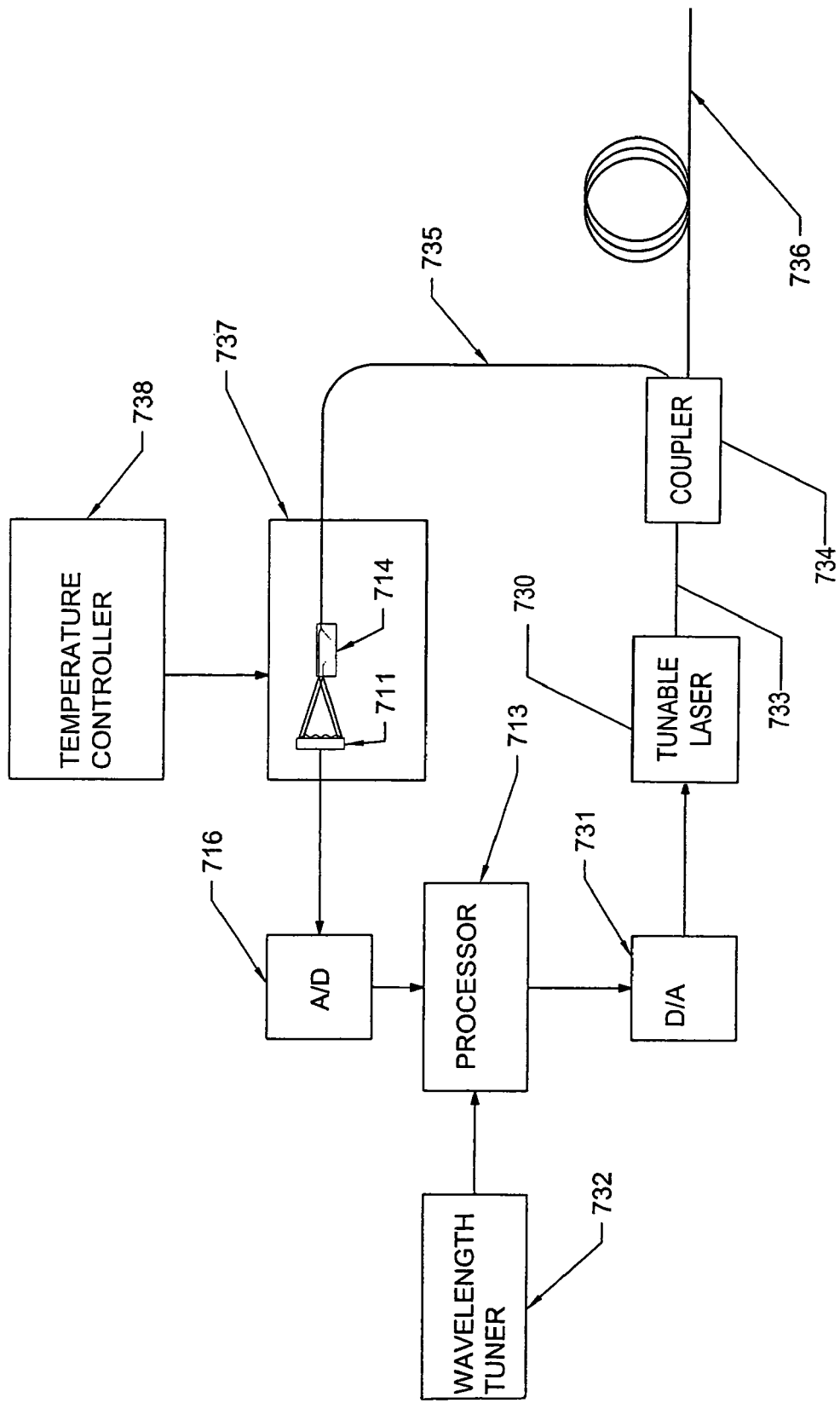
FIG. 7 is a schematic diagram of a feedback control unit that controls the wavelength of a tunable laser using the wavemeter depicted in FIG. 2 in accordance with the present invention.

FIG. 7 is a schematic diagram of a feedback control unit for a tunable laser 730 and including the wavemeter depicted in FIG. 2 in accordance with the present invention. As illustrated, light from the tunable laser 730 may be coupled into a fiber 733 and conveyed to a fiber directional coupler 734. A fraction of the light from the laser 730 may continue from the coupler to the output fiber 736, which may transport it to some application (not shown). Part of the light may be coupled by the coupler 734 into a second fiber 735, and conveyed to the wavelength measuring apparatus 737, as shown in detail in FIG. 2. For illustrative purposes, only the planar waveguide beam splitter 714 and the photodiode array 711 are shown in FIG. 7. The temperature of the wavelength measuring apparatus 737 may be controlled by a temperature controller 738 to hold the temperature of the wavelength measuring apparatus 737 constant.

The electrical signal from the photodiode array 711 may be converted to a digital signal by an analog-to-digital converter means 716, and the digital signal may be conveyed to processor means 713. The processor means 713 may analyze the digital signal to determine the measure wavelength value of the light from the tunable laser 730.

The processor means 713 may also compare the measured wavelength value with a desired wavelength value from wavelength tuner means 732 and calculate an error value representing the difference between the desired wavelength value and the measured wavelength value. The error value may be further processed by the processor means 713 to provide an appropriate digital feedback signal. The digital feedback signal may be conveyed to digital-to-analog converter means 731 for conversion to an analog signal that is conveyed to the tunable laser 730 for controlling its wavelength.

The wavelength tuner means 732 may allow the user to digitally set the desired wavelength value, which may be conveyed to the processor means 713, thereby controlling the tunable laser 730. Those familiar with the art will realize that the feedback loop described in FIG. 7 could be accomplished in many other ways. For example, the integration and amplification could be accomplished by analog electrical means instead of processor means 713.

Those familiar with the art will also realize that although the wavelength tuner means 732 is described as a digital tuner, a similar device for controlling the wavelength of the tunable laser 730 may be an analog tuner, or an external processor or a computer.

It will also be apparent to those familiar with the art that although the temperature of the wavelength measuring apparatus 737 may be controlled by the temperature controller 738, a similar device could be built in which the temperature of the wavelength measuring apparatus 737 may be measured and conveyed to the processor means 713, and the appropriate correction to the measured wavelength may be made by the processor means 713.

Figure 8:
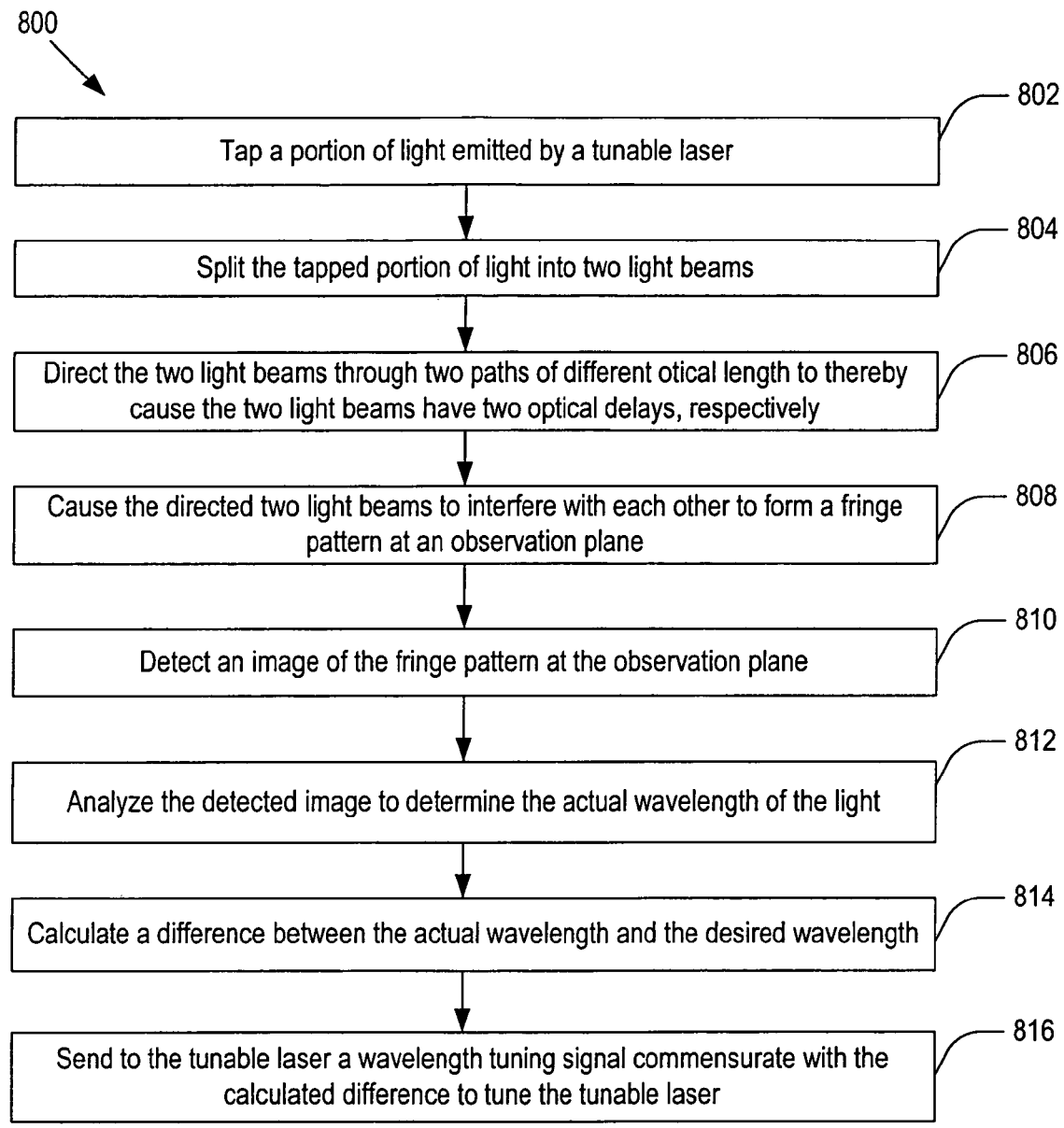
FIG. 8 is a flow chart illustrating steps that may be carried out to feedback control a tunable laser in accordance with the present invention.

FIG. 8 is a flow chart shown at 800 illustrating steps that may be carried out to feedback control a tunable laser in accordance with the present invention. It will be appreciated by those of the ordinary skill that the illustrated steps (or equivalently, process) may be modified in a variety of ways without departing from the spirit and scope of the present invention. For example, various portions of the illustrated process may be combined, be rearranged in an alternate sequence, be removed, and the like. In addition, it should be noted that the process may be performed in a variety of ways, such as by software executing in a general-purpose computer, by firmware and/or computer readable medium executed by a microprocessor, by dedicated hardware, and the like.

The process may begin at a state 802. In the state 802, a portion of light emitted by a tunable laser may be tapped by a coupler 734. Then, the portion of light may be input to a wavelength measuring apparatus 737 that may split the input signal into two light beams in a state 804. Subsequently, in a state 806, the wavelength measuring apparatus 737 may direct the two light beams through two optical paths of different optical path length, respectively.

The wavelength measuring apparatus 737 may have two output ports that are located at the ends of two optical paths and configured to emit the two light beams, respectively, where the two light beams may develop a difference in optical delay as they pass through the two optical paths. In a state 808, the two light beams exiting the two output ports may interfere with each other to form a fringe patterns at an observation plane. Next, in a state 810, an image of the fringe pattern may be detected by a photo detector 711, such as a photodiode array, that may send the image information to a processor 713. Subsequently, in a state 812, the processor 713 may analyze the received image information to determine the actual wavelength of the light. Then, the process may advance to a state 814.

In the state 814, the processor 713 may calculate the difference between the actual wavelength and a desired wavelength, where the desired wavelength may be set by the user of the tunable laser. Then, in a state 816, the processor 713 may send a wavelength tuning signal to the tunable laser, where the wavelength tuning signal is commensurate with the difference. Subsequently, the tunable laser may emit light having a tuned wavelength, a portion of which is tapped by the coupler 734 in the state 802 forming a feedback control loop.

The above are exemplary modes of carrying out the invention and are not intended to be limiting. It will be apparent to those of ordinary skill in the art that modifications thereto can be made without departure from the spirit and scope of the invention as set forth in the following claims.

The invention claimed is:

1. A control unit for controlling a wavelength of light from a tunable laser, said control unit comprising:
   a wavelength tuner for providing information of a desired wavelength;
   a coupler for tapping a portion of light from the tunable laser; and
   an apparatus for measuring an actual wavelength of said portion of light, including:
      an optical device having an input port for receiving said portion of light from said coupler, two output ports, beam splitting means for splitting said portion of light received by said input port into first and second beams, and first and second optical paths configured to have different optical lengths and to direct said first and second beams to said two output ports, respectively, wherein said two output ports are separated by a first distance such that said first and second beams exiting said two output ports form a fringe pattern at an observation plane disposed at a second distance from said two output ports;

a photo detector for receiving an image of said fringe pattern at said observation plane and generating one or more detection signals responsive thereto; and a processor for receiving said detection signals, for analyzing said detection signals to determine said actual wavelength of said portion of light, for receiving said information of said desired wavelength from said wavelength tuner, for calculating an error value representing a difference between said desired wavelength and said actual wavelength and for sending a control signal commensurate with said error value to the tunable laser to tune the tunable laser.

2. The control unit of claim 1, wherein said processor analyzes said detection signals by determining the relative position of a particular fringe with respect to a reference point on said observation plane, said particular fringe being selected from a plurality of fringes that form said fringe pattern.

3. The control unit of claim 2, wherein said processor further analyzes said detection signals by determining the average spacing between said plurality of fringes.

4. The control unit of claim 1, wherein said processor analyzes said detection signals by determining the average of two phases corresponding to two points in said fringe pattern.

5. The control unit of claim 4, wherein said processor further analyzes said detection signals by determining a phase difference between said two points.

6. The control unit of claim 1, wherein said processor analyzes said detection signals by:
determining an order number of said portion of light at a reference point on said photo detector;
determining an optical delay at said reference point; and
using said determined order number and optical delay to calculate said actual wavelength of said portion of light.

7. The control unit of claim 1, wherein said optical device is in the form of an integrated optical circuit and wherein said beam splitting means includes a waveguide beam splitter.

8. The control unit of claim 1, wherein said beam splitting means include a fiber optic splitter and wherein said first and second optical paths are defined by first and second optic fibers coupled to said fiber optic splitter.

9. The control unit of claim 1, further including a heat sink that is in thermal communication with said optical device to remove heat therefrom.

10. The control unit of claim 9, further comprising:
a temperature controller coupled to said optical device and configured to control the temperature of said optical device by regulating the temperature of said heat sink.

11. The control unit of claim 1, further comprising:
a temperature sensor coupled to said optical device and configured to generate a temperature signal indicative of the temperature of said optical device, wherein said processor analyzes said detection signals by determining optical delays in said first and second optical paths at said temperature using said temperature signal.

12. The control unit of claim 1, wherein said photo detector includes a photodiode array sensor for receiving the image of the fringe pattern.

13. The control unit of claim 1, wherein said photo detector includes one or more linear arrays of optical fibers, the input ends of said optical fibers being configured to receive said image of said fringe pattern.

14. The control unit of claim 13, wherein said input ends of said optical fibers of each linear array are separated by a distance corresponding to approximately ¼ of the spacing between two neighboring fringes.

15. A method for feedback controlling a tunable laser to generate light having a desired wavelength, the method comprising:
tapping a portion of light emitted by the tunable laser;
splitting said tapped portion of light into two light beams;
directing said two light beams through two paths of different optical length to thereby cause said two light beams have two optical delays, respectively;
causing said directed two light beams to interfere with each other to form a fringe pattern at an observation plane;
detecting an image of said fringe pattern at said observation plane;
analyzing said detected image to determine an actual wavelength of said portion of light;
calculating a difference between said actual wavelength and said desired wavelength; and
sending to the tunable laser a wavelength tuning signal commensurate with said calculated difference to tune the tunable laser.

16. The method of claim 15, wherein said step of analyzing said detected image includes the step of:
determining the relative position of a particular fringe with respect to a reference point on said observation plane, said particular fringe being selected from a plurality of fringes that form said fringe pattern.

17. The method of claim 16, wherein said step of analyzing said detected image further includes the step of:
determining the average period of said plurality of fringes.

18. The method of claim 15, wherein said step of analyzing said detected image includes the step of:
determining the average of two phases corresponding to two points in said fringe pattern.

19. The method of claim 18, wherein said step of analyzing said detected image further includes the step of:
determining the difference in said two phases.

20. The method of claim 15, further comprising the step of:
causing a temperature controller to maintain the temperature of said two paths constant.

21. The method of claim 15, further comprising the steps of:
generating a temperature signal indicative of the temperature of said two paths; and
using said temperature signal to determine optical delays in said two paths at said temperature.

* * * * *